UNITED STATES PATENT OFFICE.

MAX HENRY ISLER AND OSCAR BALLY, OF MANNHEIM, GERMANY, ASSIGNORS TO BADISCHE ANILIN & SODA FABRIK, OF LUDWIGSHAFEN-ON-THE-RHINE, GERMANY, A CORPORATION.

ANTHRAQUINONE DYES AND PROCESS OF MAKING THEM.

1,093,427. Specification of Letters Patent. Patented Apr. 14, 1914.

No Drawing. Application filed February 4, 1913. Serial No. 746,191.

*To all whom it may concern:*

Be it known that we, MAX HENRY ISLER and OSCAR BALLY, Ph. D., chemists, citizens of the Swiss Republic, residing at Mannheim, Germany, have invented new and useful Improvements in Anthraquinone Dyes and Processes of Making Them, of which the following is a specification.

In the specification of Patent No. 809,892 it is stated that, by fusing benzanthrone with potassium hydrate, a vat coloring matter can be obtained. This vat coloring matter has been termed dibenzanthrone and possesses a constitution corresponding to the formula:—

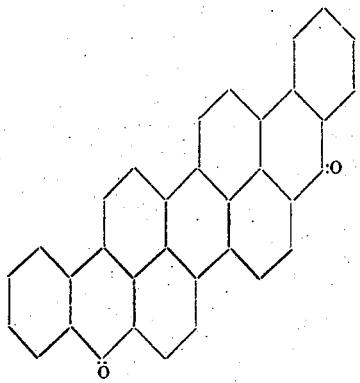

We have now discovered that, by treating dibenzanthrone with an oxidizing agent, we can obtain new compounds which are reducible, for instance, in aqueous suspension with sodium bisulfite or sodium sulfid or in concentrated sulfuric acid with a reducing agent, such for instance as copper powder, or in the presence of an organic solvent with, for instance, stannous chlorid. The reduced compounds can be brought back again to the oxidized form, for instance, with an oxidizing agent. The new compounds, either in the oxidized or reduced state, dye cotton, from the hydrosulfite vat, olive-green shades and the color of the vat is blue. In the oxidized form, they give red-brown solutions in concentrated sulfuric acid, while in the reduced form the color of such solution is from violet-red to bluish red. Our new compounds are further characterized by consisting when dry of dark powders which are insoluble in water, and in dilute acids.

The following examples will serve to illustrate further the nature of our invention and how it can be carried into practical effect, but the invention is not confined to these examples. The parts are by weight.

Example 1: Dissolve 10 parts of purified dibenzanthrone, while well stirring, in 200 parts of 96% sulfuric acid, then add, slowly, 200 parts of 70% sulfuric acid and afterward add, drop by drop, at a temperature of from about 25° to 30° C., a solution of 7.5 parts of 62% nitric acid in 25 parts of 70% sulfuric acid. When a test portion shows that no dibenzanthrone is present, pour the mass into water and filter the reaction product, which is obtained in the form of a yellowish brown paste which, upon drying, yields a black-brown powder. Its solution in concentrated sulfuric acid is red-brown, which turns violet-red on the addition of a reducing agent, such as copper powder. It is insoluble in caustic soda solution, in sodium carbonate solution, and in dilute mineral acids. It forms a blue vat with alkaline hydrosulfite and dyes cotton olive-green shades.

Example 2: Dissolve 10 parts of dibenzanthrone and 5 parts of dry boric acid, while well stirring, in 200 parts of 96% sulfuric acid and then, at a temperature of about 25° C., add a suspension of 10 parts of finely divided manganese dioxid in 20 parts of 96% sulfuric acid, at such a speed that the temperature rises of its own accord to about 60° C. Then continue stirring for about 1 hour until a test portion shows that no dibenzanthrone is present. Isolate the reaction product as described in the foregoing example.

If the oxidation with manganese dioxid be carried out in fuming sulfuric acid, a soluble sulfonic acid of the oxidized product is obtained.

Example 3: The oxidation products can be reduced, for instance, as follows: Add 100 parts of sodium bisulfite solution of 38° Bé. to the suspension obtained by pouring the melt into water as described in the foregoing Example 1. Then boil the whole and filter. The new reduction product separates out from the filtrate in the form of blue flakes. It yields a bluish red solution in concentrated sulfuric acid, and, upon the addition of water, blue flakes are obtained which are soluble with a green color in warm, very dilute caustic soda solution, so that apparently a hydroxy compound of dibenzanthrone has been obtained. The hydrosulfite vat of the new product behaves in a manner similar to the vat described in the foregoing Example 1. On oxidizing the new reduction product, for instance with manganese dioxid in the presence of sulfuric acid, the initial material, insoluble in caustic soda, is obtained.

Now what we claim is:—

1. The process of producing coloring matters of the anthraquinone series by treating dibenzanthrone with an oxidizing agent.

2. The process of producing coloring matters of the anthraquinone series by treating dibenzanthrone with an oxidizing agent and then treating the product with a reducing agent.

3. The process of producing coloring matters of the anthraquinone series by treating dibenzanthrone with nitric acid in the presence of sulfuric acid.

4. The process of producing coloring matters of the anthraquinone series by treating dibenzanthrone with nitric acid in the presence of sulfuric acid and then treating the product so obtained with sodium bisulfite.

5. As new articles of manufacture the coloring matters of the anthraquinone series which are obtainable by treating dibenzanthrone with an oxidizing agent which consist when dry of dark powders, which are insoluble in water, and in dilute acids, which dye cotton olive-green shades, from a blue hydrosulfite vat, and which in the oxidized form give red-brown solutions in concentrated sulfuric acid and in the reduced form violet-red to bluish-red solutions.

6. As a new article of manufacture the coloring matter of the anthraquinone series which can be obtained by treating dibenzanthrone with an oxidizing agent, which coloring matter consists, when dry, of a black-brown powder, which gives a red-brown solution in concentrated sulfuric acid, which solution turns violet-red on the addition of copper powder, which new coloring matter is insoluble in dilute acids and alkalis, and yields a blue vat with alkaline hydrosulfite, and dyes cotton olive-green shades.

In testimony whereof we have hereunto set our hands in the presence of two subscribing witnesses.

MAX HENRY ISLER.
OSCAR BALLY.

Witnesses:
J. ALEC LLOYD,
JOSEPH PEIFFER.